(12) United States Patent
Peng et al.

(10) Patent No.: US 12,117,371 B2
(45) Date of Patent: Oct. 15, 2024

(54) METHOD AND APPARATUS OF FULL-FIELD VIBRATION MEASUREMENT VIA MICROWAVE SENSING

(71) Applicant: SHANGHAI JIAO TONG UNIVERSITY, Shanghai (CN)

(72) Inventors: Zhike Peng, Shanghai (CN); Yuyong Xiong, Shanghai (CN); Guang Meng, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 649 days.

(21) Appl. No.: 17/288,264

(22) PCT Filed: May 19, 2020

(86) PCT No.: PCT/CN2020/091009
§ 371 (c)(1),
(2) Date: Apr. 23, 2021

(87) PCT Pub. No.: WO2021/109473
PCT Pub. Date: Jun. 10, 2021

(65) Prior Publication Data
US 2022/0187158 A1 Jun. 16, 2022

(30) Foreign Application Priority Data

Jan. 13, 2020 (CN) .......................... 202010032190.0
Apr. 21, 2020 (CN) .......................... 202010316293.X

(51) Int. Cl.
*G01M 7/02* (2006.01)
*G01S 7/35* (2006.01)
(Continued)

(52) U.S. Cl.
CPC ............... *G01M 7/025* (2013.01); *G01S 7/35* (2013.01); *G01S 13/82* (2013.01); *G01S 13/88* (2013.01)

(58) Field of Classification Search
CPC .......... G01M 7/025; G01S 7/35; G01S 13/82; G01S 13/88; G01S 13/42; G01S 13/34
See application file for complete search history.

(56) References Cited

U.S. PATENT DOCUMENTS

| 2015/0204972 A1* | 7/2015 | Kuehnle | ................. G01S 13/42 342/156 |
|---|---|---|---|
| 2016/0131742 A1 | 5/2016 | Schoor | |

(Continued)

FOREIGN PATENT DOCUMENTS

| CN | 105339806 A | 2/2016 |
|---|---|---|
| CN | 106289691 A | 1/2017 |

(Continued)

OTHER PUBLICATIONS

Machine Translation of Peng, CN 107607923 A (Year: 2018).*
PCT; App. No. PCT/CN2020/091009; International Search Report mailed Sep. 28, 2020.

*Primary Examiner* — Jennifer Bahls
*Assistant Examiner* — Quang X Nguyen
(74) *Attorney, Agent, or Firm* — Fitch, Even, Tabin & Flannery, LLP

(57) ABSTRACT

The present invention relates to a full-field vibration measurement method based on microwave sensing, which is characterized by comprising the following steps: step 1, repeatedly transmitting linear frequency modulated continuous wave microwave signals by means of one or more transmitting antennas; step 2, receiving reflected signals from targets and/or measurement points by means of a plurality of receiving antennas, and performing frequency mixing on received signals and local oscillator signals to (Continued)

obtain multi-channel intermediate frequency baseband signals; step 3, acquiring intermediate frequency baseband signals in various channels, and resolving and positioning targets and/or measurement points within the full field based on a joint range and angle dimension; and step 4, extracting vibration displacement time-domain information of targets to be measured and/or measurement points. By means of the full-field vibration measurement method based on microwave sensing provided in the present invention, synchronous vibration information measurement of targets and/or measurement points within the full field is achieved by positioning and resolving the targets and/or measurement points within the full field based on a joint range-angle dimension and tracking phase evolution, thereby solving the difficulties in the prior art that full-field vibration measurement and interference suppression cannot be achieved.

17 Claims, 8 Drawing Sheets

(51) Int. Cl.
*G01S 13/82* (2006.01)
*G01S 13/88* (2006.01)

(56) References Cited

U.S. PATENT DOCUMENTS

2017/0299427 A1   10/2017  Nohmi
2021/0003692 A1*   1/2021  Nohmi ............... G01S 13/58

FOREIGN PATENT DOCUMENTS

| | | |
|---|---|---|
| CN | 106323450 A | 1/2017 |
| CN | 106443613 A | 2/2017 |
| CN | 107607923 A | 1/2018 |
| CN | 108387892 A | 8/2018 |
| CN | 109521404 A | 3/2019 |
| EP | 3014297 A1 | 5/2016 |
| JP | 2015104096 A | 6/2015 |

* cited by examiner

Situation 1

Situation 2

Situation 3

METHOD AND APPARATUS OF FULL-FIELD VIBRATION MEASUREMENT VIA MICROWAVE SENSING

CROSS-REFERENCE TO RELATED APPLICATIONS

This application is a U.S. national phase application of International Application No. PCT/CN2020/091009, filed May 19, 2020, which claims priority to Chinese Patent Application No. 202010032190.0, filed Jan. 13, 2020, and Chinese Patent Application No. 202010316293.X, filed Apr. 21, 2020.

FIELD OF THE INVENTION

The present invention relates to the technical field of non-contact vibration measurement, and in particular to a full-field vibration measurement method and system based on microwave sensing.

DESCRIPTION OF THE PRIOR ART

Vibration measurement is an important way to achieve the test of mechanical properties of structures, health monitoring and fault diagnosis, and the extraction of other micromotion features. Non-contact vibration measurement has obvious advantages in terms of easiness to mount sensors, measurement of lightweight and large-scale structures, etc. Currently, common non-contact vibration measurement technologies comprise a laser Doppler vibration measurement technology and a vision-based vibration measurement technology. For the laser Doppler vibration measurement technology, it is used to measure the vibration velocity based on a laser Doppler frequency shift caused by vibration, and it often can only test at a single point and has higher requirement for measurement environments. In terms of multi-measurement point vibration measurement, scanning is required, and the laser Doppler vibration measurement technology cannot achieve multi-measurement point synchronous vibration measurement and is limited in scanning scope. For the vision-based vibration measurement technology, it is used to extract vibration information by means of visual image processing, but it is generally low in measurement precision, large in amount of calculation and narrow in vibration amplitude and frequency response scope, and is easily affected by light and the like.

In addition, the new technology and method for vibration measurement based on microwave sensing can realize non-contact structural deformation and vibration measurement. Its basic principle is to extract vibration information based on phase modulation and interferometry by transmitting microwave signals of a specific form and receiving electromagnetic echo signals reflected by a target. According to the working mode, the vibration measurement based on microwave sensing may be divided into two types: vibration measurement based on a single-frequency continuous wave radar and vibration measurement based on a frequency modulated continuous wave radar. The former is used to transmit carrier signals of a single frequency and is relatively sensitive to vibration information. However, due to the lack of a range sensing capability, the former can only be used for the vibration measurement of a single target or a single measurement point, but not to resolve multiple targets or multiple measurement points, and is easily interfered by other clutters in the radiation scope of a radar beam. According to the vibration measurement based on a frequency modulated continuous wave radar, multiple targets or multiple measurement points can be resolved by using range information, so as to achieve multi-point synchronous vibration measurement.

A significant challenge of the vibration measurement based on microwave sensing is clutter interference, including interference of clutters reflected by static targets in the radiation scope of a radar beam, coupling interference of signals reflected by adjacent targets, aliasing interference of signals from targets in the same range cell, etc. Particularly, for full-field vibration measurement, there are often many measurement points and they are spaced apart at small intervals. Because the vibration measurement based on a frequency modulated continuous wave radar makes it possible to resolve different targets and/or measurement points by range, it is limited by a transmission bandwidth, and often has a limited range resolution and serious problems of static clutter interference, adjacent multi-component coupling interference, and aliasing interference of components in the same range cell. Moreover, when multiple interferences are coupled together in practical applications, it is difficult in the prior art to achieve effective interference suppression and compensation, and high-precision deformation and vibration measurement cannot be achieved.

In addition, in the prior art, measurement points are only resolved by means of range profile information, which requires all measurement points to be spaced apart by at least 1 to 2 range cells in terms of range dimension. However, for full-field vibration measurement, the targets and/or measurement points are distributed in a plane and in space, causing the problems of difficulty in resolving the targets and/or measurement points in adjacent range cells and inability of resolving the targets and/or measurement points in the same range cell, etc., making it difficult to extract and measure synchronous vibration information of the targets and/or measurement points within the full field.

SUMMARY OF THE INVENTION

The present invention provides a full-field vibration measurement method and system based on microwave sensing, in order to overcome the shortcomings and defects of the prior art.

To achieve the above purposes, the present invention is implemented through the following technical solutions:
a full-field vibration measurement method based on microwave sensing, characterized by comprising the following steps:
step 1, repeatedly transmitting linear frequency modulated continuous wave microwave signals by means of one or more transmitting antennas;
step 2, receiving reflected signals from targets and/or measurement points by means of a plurality of receiving antennas, and performing frequency mixing on received signals and local oscillator signals to obtain multi-channel intermediate frequency baseband signals;
step 3, acquiring intermediate frequency baseband signals in various channels, and resolving and positioning targets and/or measurement points within the full field based on a joint range and angle dimension; and
step 4, extracting vibration displacement time-domain information of targets to be measured and/or measurement points.

According to one embodiment of the present invention: in step 1, the plurality of transmitting antennas are used for the synthesis of a virtual antenna array, which is equivalent to increasing the number of receiving antennas and baseband signal output channels.

According to one embodiment of the present invention: in step 1, the linear frequency modulated continuous wave microwave signals are repeatedly transmitted in a successive manner or at a fixed interval.

According to one embodiment of the present invention: in step 2, the number of the receiving antennas is greater than or equal to 2.

According to one embodiment of the present invention: in step 2, the local oscillator signals have the same frequency as the transmitted signals in step 1, both of which are separated by the same signal source.

According to one embodiment of the present invention: in step 3, the intermediate frequency baseband signals in the various channels are acquired in a synchronous manner.

According to one embodiment of the present invention: in step 3, the method for resolving and positioning targets and/or measurement points within the full field based on a joint range and angle dimension comprises:

assuming that the number of equivalent receiving antennas and channels is M, and the number of baseband signals sampled from each channel within each transmission cycle is N, step 3.1, selecting intermediate frequency baseband signals in various channels within a first or certain cycle, which are respectively denoted as $S_1, \ldots S_m, \ldots S_M$, expressing a discrete time sequence of the baseband signal $S_m$ in the channel m (m=1, 2, ... M) as [s(m, 0), ... s(m, n), ... s(m, N−1)]$^T$, taking a matrix H= $[S_1, \ldots S_m, \ldots S_M]$, and performing a two-dimensional discrete Fourier transform on the matrix H, in the order of transforming signals in each column of the matrix H first, so as to obtain a Fourier transform matrix $H_f$, and then performing a discrete Fourier transform on signals in each row of the matrix $H_f$ so as to obtain a two-dimensional discrete Fourier transform matrix $H_{ff}$;

step 3.2, calculating the amplitude of each element in the matrix $H_{ff}$, denoting the element in the k-th row and p-th column of the matrix $H_{ff}$ as S(k, p), and determining, according to a peak position of $$\sum_{p=0}^{P-1} abs(S(k, p)),$$

a range cell where each target and/or measurement point within the full field is located, where abs( ) is a complex-modulus operation, and P is the total number of columns of the matrix $H_{ff}$, and recording an index $k_l$ (l=1, ..., L) for a peak position corresponding to each target and/or measurement point, where L is the total number of the targets and/or measurement points; and step 3.3, determining an angle cell where the target and/or measurement point is located according to a peak position of the amplitude of vectors $H_{ff}(k_l,:)$ in the $k_l$-th row of the matrix $H_{ff}$, and recording an index $p_l$ (l=1, ..., L) for a peak position corresponding to each target and/or measurement point, where L is the total number of the targets and/or measurement points.

According to one embodiment of the present invention: in step 4, said extracting vibration displacement time-domain information of the targets to be measured and/or measurement points within the full field comprises the following specific steps:

step 4.1, estimating a phase evolution time sequence of each target and/or measurement point within a plurality of transmission cycles, and assuming that the phase time sequence of the l-th target and/or measurement point within the i-th cycle is $\varphi_l(iT)$, where i=, 1, 2 ..., is the serial number of the transmission cycle, and T is a repeated transmission cycle, $\varphi_l(iT)$ being calculated as:

$$\varphi_l(iT) = \arg\left[\sum_{m=0}^{M-1}\sum_{n=0}^{N-1} s_i(n, m)e^{-j\frac{2\pi n k_l}{N_z}}e^{-j\frac{2\pi m p_l}{M_z}}\right]$$

where arg[ ] is an operation for taking a complex phase, $s_i(\ )$ is a multi-channel intermediate frequency baseband signal matrix within the i-th transmission cycle, column vectors of the matrix are discrete intermediate frequency baseband signals in various channels within the i-th transmission cycle, $k_l$ is an index for a range dimension of the l-th target and/or measurement point solved in step 3.2, $p_l$ is an index for an angle dimension of the l-th target and/or measurement point solved in step 3.3, $N_z$ is the number of discrete points for discrete Fourier transform when the discrete Fourier transform is performed on the signals in each column of the matrix H in step 3.1, and $M_z$ is the number of discrete points for discrete Fourier transform when the discrete Fourier transform is performed on the signals in each row of the matrix $H_f$ in step 3.1;

step 4.2, performing phase anti jump processing on the estimated phase evolution time sequence of each target and/or measurement point; and step 4.3, extracting a vibration displacement time sequence of each target and/or measurement point, and assuming that the vibration displacement time sequence of the l-th target and/or measurement point within the i-th cycle is $x_l(iT)$, $x_l(iT)$ being calculated as:

$$x_l(iT) = \left[\frac{\lambda_c}{4\pi}(\varphi_l(iT) - \varphi_{l\_mean})\right]/\cos\phi_l,$$

where $\lambda_c$ is the wavelength corresponding to a center carrier frequency of a linear frequency modulated transmitted wave, $\alpha_{l\_mean}$ is the mean of the time sequence $\alpha_l(iT)$, i=1, 2, ..., and $\phi_l$ is an included angle between a vibration direction of the l-th target and/or measurement point and a line-of-sight direction of a radar.

According to one embodiment of the present invention: in step 4.2, the method for phase anti jump processing comprises: determining whether the difference in phases of the phase evolution time sequence within adjacent transmission cycles is greater than a certain threshold Δ, where the threshold Δ is π, and if the difference in values of two adjacent elements in the phase evolution time sequence is greater than the threshold and the value of the first element is greater than the value of the second element, adding 2π to the value of the second element; and if the difference is greater than the threshold and the value of the first element is smaller than the value of the second element, subtracting 2π from the value of the second element, wherein 2π is added or subtracted in order that the difference in values of two adjacent elements in the phase evolution time sequence is smaller than a constant value π.

According to one embodiment of the present invention: in step 3.2, the range cell and range estimation value for each target and/or measurement point may also be directly determined from range profile information, that is, calculated based on a peak position of amplitude spectrum of a certain column vector of the matrix $H_f$.

According to one embodiment of the present invention: for vibration measurement of a plurality of targets and/or measurement points distributed in a three-dimensional space, the resolving and positioning of targets and/or measurement points within the full field based on a joint range and angle dimension in step 3 are implemented in a range dimension, a horizontal azimuth angle dimension and a vertical pitch angle, respectively.

According to one embodiment of the present invention: for vibration measurement of a plurality of targets and/or measurement points distributed in a three-dimensional space, the vibration displacement time-domain information of the targets to be measured and/or measurement points within the full field is extracted in step 4 by selecting one of a horizontal azimuth angle dimension and a vertical pitch angle dimension as an angle dimension for calculation processing.

Provided is a full-field vibration measurement system based on microwave sensing, which is characterized by comprising:
  a radar front end, the radar front end comprising:
  one or more transmitting antennas; and
  a plurality of receiving antennas distributed in a linear array, wherein adjacent ones of the receiving antennas are spaced apart at an equal interval,
  and the interval is smaller than or equal to half of the wavelength of a transmitted carrier.

According to one embodiment of the present invention: the full-field vibration measurement system based on microwave sensing further comprises:
  a signal acquisition module configured to perform synchronous sampling on multi-channel intermediate frequency baseband signals and transmit the signals to a full-field vibration information extraction module;
  the full-field vibration information extraction module configured to resolve and position targets and/or measurement points within the full field based on the multi-channel intermediate frequency baseband signals acquired by the signal acquisition module, and extract a vibration displacement time sequence of each target and/or measurement point;
  a display and analysis module configured to display information including vibration displacement time-domain waveforms of each target and/or measurement point, and analyze the features, such as the vibration amplitude, frequency and full-field vibration characteristic distribution, of each target and/or measurement point as required; and
  a controller configured to set hardware parameters of the radar front end and sampling parameters of the signal acquisition module, and control sequential execution of the steps of the full-field vibration measurement method based on microwave sensing.

According to one embodiment of the present invention: the radar front end further comprises:
  an LFMCW microwave signal source, power dividers, power amplifiers, low noise amplifiers, frequency mixers and low pass filters, wherein the LFMCW microwave signal source is connected to the power divider, one end of the power divider being connected to the power amplifier and the other end thereof being connected to the frequency mixer; the power amplifier is connected to the transmitting antenna, the receiving antenna is connected to the low noise amplifier, the low noise amplifier is connected to the frequency mixer, and an output end of the frequency mixer is connected to the low pass filter;
  signals of the LFMCW microwave signal source are divided into two paths by the power divider, one of which is connected to the transmitting antenna via the power amplifier and transmitted by the transmitting antenna;
  the receiving antenna receives microwave signals reflected by the targets and/or measurement points, and the microwave signals are transmitted to the frequency mixer via the low noise amplifier; and the frequency mixer mixes the microwave signals transmitted by the low noise amplifier with the other path of microwave signals coming from the power divider, and the mixed microwave signals are processed by the low pass filter to output multi-channel baseband signals.

According to one embodiment of the present invention: the number of the power dividers and of the power amplifiers is equal to the number of the transmitting antennas; and each of the transmitting antennas is connected to one power amplifier and one power divider.

According to one embodiment of the present invention: the number of the low noise amplifiers, of the frequency mixers and of the low pass filters is equal to the number of the receiving antennas; and each of the receiving antennas is connected to one low noise amplifier, one frequency mixer and one low pass filter.

By means of the full-field vibration measurement method based on microwave sensing provided in the present invention, synchronous vibration information measurement of targets and/or measurement points within the full field is achieved by positioning and resolving the targets and/or measurement points within the full field based on a joint range-angle dimension and tracking phase evolution, thereby solving the difficulties in the prior art that full-field vibration measurement and interference suppression cannot be achieved. Using the principle that vibration information can be equivalently migrated from a range dimension to an angle dimension, the present invention finally makes it possible to estimate the phase evolution time sequence caused by the vibration of each target and/or measurement point in the angle dimension, realizing stepwise isolation and suppression of interference in two dimensions of range and angle. The stepwise isolation of interference in two dimensions of range and angle and the estimation of phase evolution information caused by the vibration of each target and/or measurement point in the angle dimension can effectively suppress static carrier interference, coupling interference of adjacent components, aliasing interference of components in the same range cell, and coupling interference formed by various types of interference, greatly improve the precision of vibration measurement of each target and/or measurement point, improve the anti-interference capability and reliability of measurement, and also provide a very high calculation efficiency.

DETAILED DESCRIPTION OF THE PREFERRED EMBODIMENTS

Figure 1:
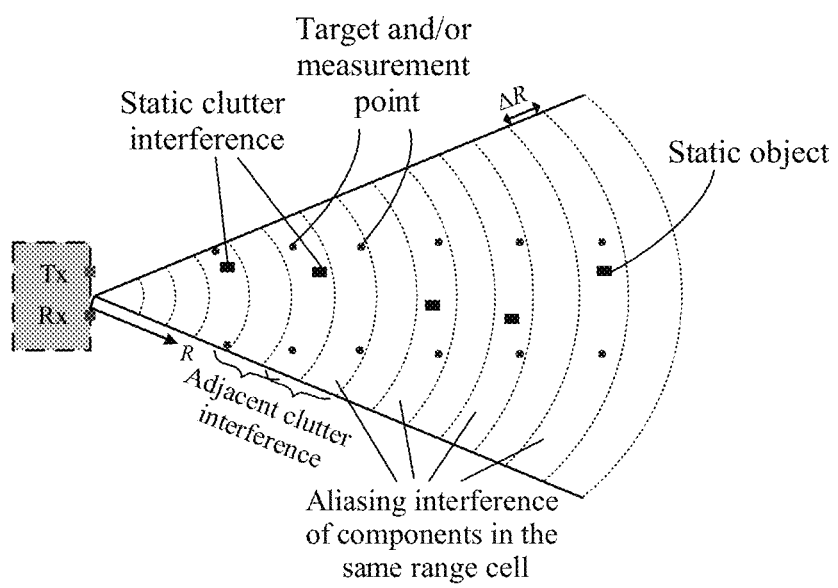
FIG. 1 is a schematic diagram of vibration measurement based on a frequency modulated continuous wave microwave radar in the prior art.

As shown in FIG. 1, in the prior art, measurement targets and/or measurement points are positioned in different range cells by beat frequency information of intermediate frequency baseband signals, and then interference phase evolution of each measurement point is tracked and estimated, so as to extract vibration information of the targets and/or measurement points. However, due to the limitation of a transmission bandwidth, the range resolution is limited, and static clutter interference, mutual interference of components in adjacent range cells, aliasing interference of components in the same range cell, and coupling interference of a plurality of interference sources make it impossible to realize accurate vibration information measurement of multiple targets and/or measurement points in the prior art, but are often used for vibration measurement of targets and/or measurement points distributed along a line and spaced farther apart. In addition, as shown in FIG. 1, two targets and/or measurement points in the same range cell cannot be resolved in the prior art, and vibration measurement of targets and/or measurement points within the full field can also not be realized.

In order to solve the defects and limitations in the prior art, the present invention provides a full-field vibration measurement method based on microwave sensing. In the present invention, a plurality of test objects, which are called targets, can be detected; and a plurality of points on a detection object may also be detected, with the detected points being called measurement points.

Figure 2:
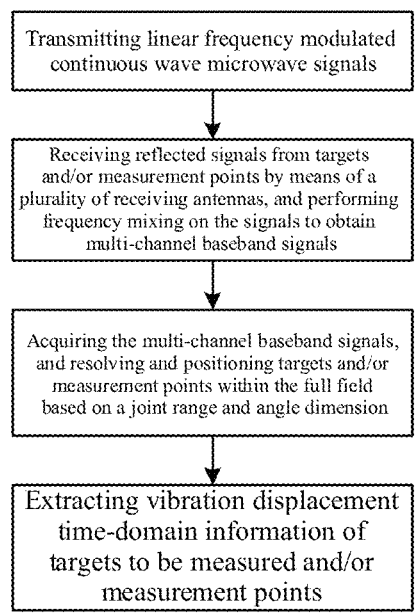
FIG. 2 is a flowchart of a full-field vibration measurement method based on microwave sensing provided in an embodiment of the present invention.
Figure 3:
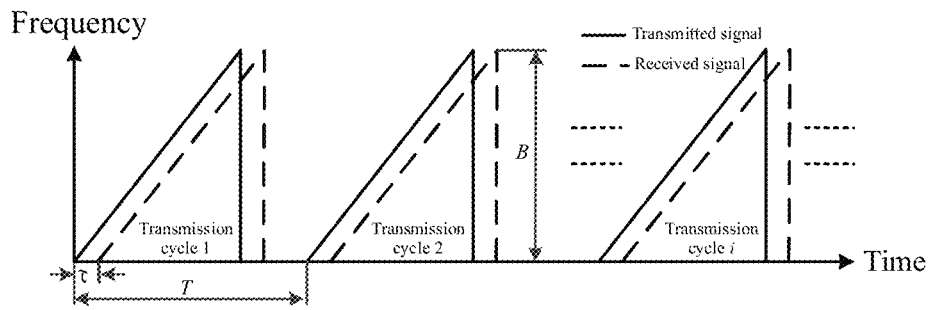
FIG. 3 is a schematic diagram of instantaneous frequencies of transmitting and receiving LFMCW signals provided in an embodiment of the present invention.

As shown in FIG. 2, the present invention comprises the following steps:

step 1, repeatedly transmitting linear frequency modulated continuous wave microwave signals by means of one or more transmitting antennas. The plurality of transmitting antennas are used for the synthesis of a virtual antenna array, which is equivalent to increasing the number of receiving antennas and baseband signal output channels, and can equivalently achieve a multiplied increase in receiving antennas and baseband signal output channels without greatly increasing the size of the antennas. The linear frequency modulated continuous wave (LFMCW) microwave signals are repeatedly transmitted in a successive manner or at a fixed interval. FIG. 3 illustrates a schematic diagram of instantaneous frequencies of repeatedly transmitting and receiving LFMCW microwave signals at a fixed interval, in which the transmission cycle is T, the bandwidth is B, the received signals are delayed signals of the transmitted signals, and the delay time is determined by the distance between the targets to be measured and/or measurement points and a radar.

Figure 4:
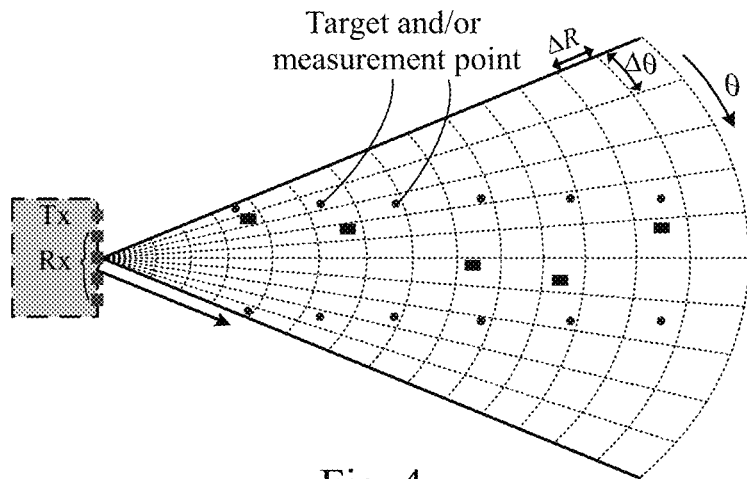
FIG. 4 is a schematic diagram of the principle of full-field vibration measurement based on microwave sensing provided in an embodiment of the present invention.

Step 2, receiving reflected signals from targets and/or measurement points by means of a plurality of receiving antennas, and performing frequency mixing on received signals and local oscillator signals to obtain multi-channel intermediate frequency baseband signals. As shown in FIG. 4, in order to implement the full-field vibration measurement method based on microwave sensing provided in the present invention, targets and measurement points within the full field need to be first resolved and positioned based on a joint range-angle dimension. Due to the difference in distances from echo signals reflected by the targets to a plurality of receiving antennas arranged in an array, azimuth angles and pitch angles between the targets and measurement points and the radar can be determined based on the difference in distances, and the LFMCW radar front end in the measurement system needs to be provided with a plurality of receiving antennas accordingly. For example, if the receiving antennas are distributed in a linear array, and the interval is d, the difference in distance from a target reflected echo to each receiving antenna is d sin θ/λ, where θ represents an azimuth angle or a pitch angle between a target and measurement point and the radar, and λ is the wavelength corresponding to a center carrier frequency of a linear frequency modulated transmitted wave.

In order to reduce phase noise by means of a range correlation effect, local oscillator signals of the radar front end have the same frequency as transmitted signals, both of which are separated by the same signal source. Based on the principle of an equivalent virtual receiving antenna array, the number of equivalent channels for intermediate frequency baseband signals is equal to the number of receiving antennas multiplied by the number of transmitting antennas.

Figure 5:
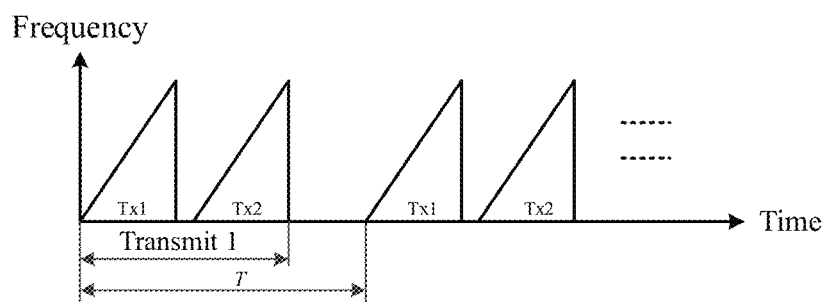
FIG. 5 is a schematic diagram of time division and repeated transmission by a plurality of transmitting antennas provided in an embodiment of the present invention.

When there are a plurality of transmitting antennas, as shown in FIG. 5, for example, the number of transmitting antennas is 2, when the transmitting antennas repeatedly transmit linear frequency modulated continuous wave microwave signals in step 1, two transmitting antennas transmit the microwave signals successively, the plurality of receiving antennas simultaneously receive reflected signals from the targets and/or measurement points in step 2, and in this case, the total transmission cycle of Tx1 and Tx2 is taken as one transmission cycle. It should be noted that in the equivalent virtual array antenna and signal transmitting method based on a plurality of transmitting antennas and a plurality of receiving antennas, signals can also be simultaneously transmitted by means of the plurality of transmitting antennas, but it is achieved by means of a fixed difference in the initial phases of microwave signals transmitted by each transmitting antenna. For vibration measurement of a plurality of targets and/or measurement points distributed in a three-dimensional space, a horizontal azimuth angle sensing array and a vertical pitch angle sensing array are respectively used for transmission and reception sequentially.

Step 3, acquiring intermediate frequency baseband signals in various channels, and resolving and positioning targets and/or measurement points within the full field based on a joint range and angle dimension. In order to achieve interference maintenance and use phase information of intermediate frequency baseband signals in various channels, the intermediate frequency baseband signals in various channels need to be acquired in a synchronous manner.

Figure 6:
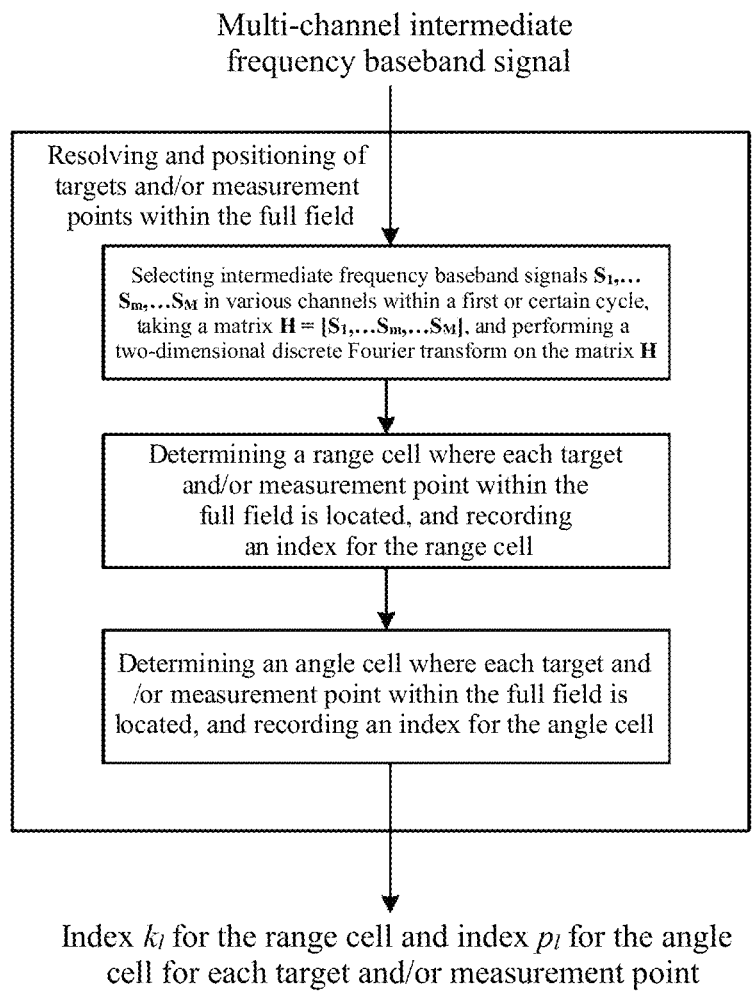
FIG. 6 is a flowchart of a method for resolving and positioning targets and/or measurement points within the full field provided in an embodiment of the present invention.

As shown in FIG. 6, the method for resolving and positioning targets and/or measurement points within the full field based on a joint range and angle dimension comprises:

assuming that the number of equivalent receiving antennas and channels is M, and the number of baseband signals sampled from each channel within each transmission cycle is N.

Step 3.1, selecting intermediate frequency baseband signals in various channels within a first or certain cycle, which are respectively denoted as $S_1, \ldots S_m, \ldots S_M$, expressing a discrete time sequence of the baseband signal $S_m$ in the channel m (m=1, 2, ... M) as $[s(m, 0), \ldots s(m, n), \ldots s(m, N-1)]^T$, taking a matrix $H = [S_1, \ldots S_m, \ldots S_M]$, and performing a two-dimensional discrete Fourier transform on the matrix H, in the order of transforming signals in each column of the matrix H first, so as to obtain a Fourier transform matrix $H_f$, and denoting the number of points for the discrete Fourier transform as $N_z$. During calculation, $N_z \geq N$, in order to facilitate fast calculation of the Fourier transform, zoom frequency spectrum, overcome a fence effect, etc.; and then a discrete Fourier transform is performed on signals in each row of the matrix $H_f$, so as to obtain a two-dimensional discrete Fourier transform matrix $H_{ff}$, and the number of points for the discrete Fourier transform is denoted as $M_z$. During calculation, $M_z \geq M$, in order to facilitate fast calculation of the Fourier transform, zoom frequency spectrum, overcome a fence effect, etc.

In the aforementioned discrete time sequence $[s(m, 0), \ldots s(m, n), \ldots s(m, N-1)]^T$, n is an intermediate number between 0 and N−1, and may also be represented by any other letter, such as i.

Generally, for full-field vibration measurement, the targets and/or measurement points are in a vibration state, rather than a fast motion state. In order to reduce the amount of calculations and repeated calculations, the targets and/or measurement points within the full field may be resolved and positioned by selecting the intermediate frequency baseband signals in various channels within the first or certain cycle. By taking the intermediate frequency baseband signals in various channels within the first transmission cycle as an example, a discrete Fourier transform is performed on signals in each column of the matrix $H=[S_1, \ldots S_m, \ldots S_M]$, so as to obtain range profile information of each channel baseband signal. Since the distance between the receiving antennas does not exceed one-half of the wavelength of a carrier, each channel baseband signal has basically the same beat frequency distribution, except for a specific difference in phase. Therefore, the phase difference between multiple channels can be used to estimate the azimuth angle or pitch angle between the target and/or the measurement point and the radar. The corresponding calculation method comprises: performing a discrete Fourier transform on signals in each row of the matrix $H_f$, so as to obtain a two-dimensional discrete Fourier transform matrix $H_{ff}$, thereby realizing the estimation of an angle dimension of targets and/or measurement points in each range cell. It should be pointed out that, in order to facilitate fast calculation of the Fourier transform, zoom frequency spectrum, overcome a fence effect, etc., the number of points for the Fourier transform may be greater than or equal to the number of signal points during calculation of the discrete Fourier transform.

Step 3.2, calculating the amplitude of each element in the matrix $H_{ff}$, denoting the element in the k-th row and p-th column of the matrix $H_{ff}$ as $S(k, p)$, determining, according to a peak position of $$\sum_{p=0}^{P-1} \mathrm{abs}(S(k, p))$$

(where $\mathrm{abs}(\Box)$ is a complex-modulus operation, and P is the total number of columns of the matrix $H_{ff}$), a range cell where each target and/or measurement point within the full field is located, and recording an index $k_l$ (l=1, ..., L) for a peak position corresponding to each target and/or measurement point, where L is the total number of targets and/or measurement points.

Generally, the amplitude of signals in a column of the matrix $H_f$ can be calculated, and the range cell where each target and/or measurement point within the full field is located can be determined by means of a peak search method. Since the Fourier transform is a linear transform, in order to improve the signal-to-noise ratio and facilitate unified calculation with multi-channel sensing information, beat frequencies between various targets and/or measurement points within the full field are determined according to the peak position of $$\sum_{p=0}^{P-1} \mathrm{abs}(S(k, p)),$$

and the range cell where the targets and/or measurement points are located is determined according to the beat frequency. The index $k_l$ is an index for a peak position of the vector $$\sum_{p=0}^{P-1} \mathrm{abs}(S(k, p))$$

that corresponds to the l-th target and/or measurement point. It should be pointed out that there may be a plurality of targets and/or measurement points in the same range cell, and in this case, the next step is required for angle resolving and positioning.

Step 3.3, determining an angle cell where the target and/or measurement point is located according to a peak position of the amplitude of vectors $H_{ff}(k_l,:)$ in the $k_l$-th row of the matrix $H_{ff}$, and recording an index $p_l$ (l=1, . . . , L) for a peak position corresponding to each target and/or measurement point, where L is the total number of the targets and/or measurement points.

The vectors $H_{ff}(k_l,:)$ in the $k_l$-th row of the matrix $H_{ff}$ are obtained through a discrete Fourier transform of the vectors $H_f(k_l,:)$ in the $k_l$-th row of the matrix $H_f$. For the convenience of description, by taking the first channel (the first column of the matrix $H_f$) as a reference point and a signal component corresponding to the target 1 as an analysis object, $H_f(k_l,:)$ can be expressed as:

$$H_f(k_l,:) = A_l e^{j\Phi_l} \begin{bmatrix} 1 \\ \exp(j2\pi d \sin\theta_l/\lambda_c) \\ \vdots \\ \exp(j2\pi(M-1)d\sin\theta_l/\lambda_c) \end{bmatrix}$$

where $A_l e^{j\Phi_l}$ is an element in the $k_l$-th row and first column of the matrix $H_f$, d is the spacing distance between the receiving antennas, and $\theta_l$ is an azimuth angle or a pitch angle of the target 1 in the field of view of the radar. Accordingly, a discrete Fourier transform is performed on the vectors $H_f(k_l,:)$, and $\theta_l=\arcsin(f_l\lambda_c/d)$ can be calculated by means of amplitude spectrum peak search, where $f_l$ is the frequency of an amplitude spectrum peak corresponding to the target 1, and the index $p_l$ corresponding to the peak position is recorded. For vibration measurement of a plurality of targets and/or measurement points distributed in a three-dimensional space, the azimuth angles and pitch angles of the targets and/or measurement points should be obtained sequentially according to the method in step 3.3. Joint dimension data of a range dimension and a horizontal azimuth angle dimension is solved according to the signals obtained from the horizontal azimuth angle sensing array; and joint dimension data of a range dimension and a vertical pitch angle dimension is solved according to the signals obtained from the vertical pitch angle sensing array.

Figure 7:
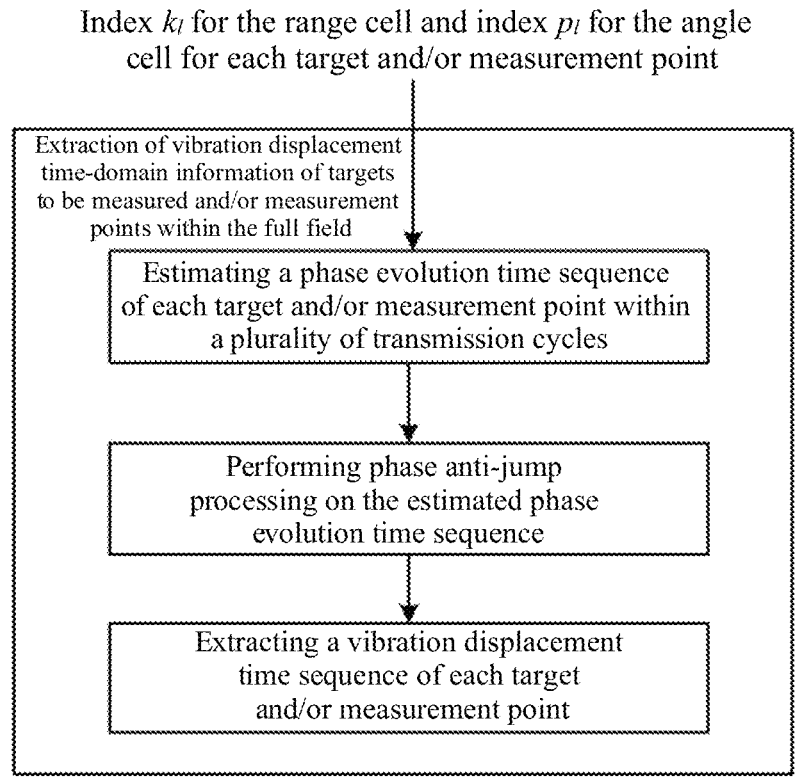
FIG. 7 is a flowchart of a method for extracting vibration displacement time-domain information of targets and/or measurement points provided in an embodiment of the present invention.

Step 4, extracting vibration displacement time-domain information of targets to be measured and/or measurement points. The specific method comprises, as shown in FIG. 7, the following steps:

step 4.1, estimating a phase evolution time sequence of each target and/or measurement point within a plurality of transmission cycles, and assuming that the phase time sequence of the l-th target and/or measurement point within the i-th cycle is $\varphi_l(iT)$, where i=1, 2, . . . is the serial number of the transmission cycle, and T is a repeated transmission cycle, $\varphi_l(iT)$ being calculated as:

$$\varphi_l(iT) = \arg\left[\sum_{m=0}^{M-1}\sum_{n=0}^{N-1} s_i(n,m)e^{-j\left(\frac{2\pi n k_l}{N_z}\right)}e^{-j\frac{2\pi m p_l}{M_z}}\right]$$

where arg [ ] is an operation for taking a complex phase, $s_i(\ )$ is a multi-channel intermediate frequency baseband signal matrix within the i-th transmission cycle, column vectors of the matrix are discrete intermediate frequency baseband signals in various channels within the i-th transmission cycle, $k_l$ is an index for a range dimension of the l-th target and/or measurement point solved in step 3.2, $p_l$ is an index for an angle dimension of the l-th target and/or measurement point solved in step 3.3, $N_z$ is the number of discrete points for discrete Fourier transform when the discrete Fourier transform is performed on the signals in each column of the matrix H in step 3.1, and $M_z$ is the number of discrete points for discrete Fourier transform when the discrete Fourier transform is performed on the signals in each row of the matrix $H_f$ in step 3.1.

It can be learned from the principle of vibration measurement based on an LFMCW microwave radar, a discrete Fourier transform coefficient corresponding to a range cell where a target and/or measurement point is located can be expressed as $Ae^{j(\theta_R+\varphi_i)}$, where A is a complex amplitude, and is proportional to the strength of signals reflected from the target and/or measurement point. $\theta_R$ is a fixed phase caused by the distance of the targets and/or measurement points, and $\varphi_i$ is the amount of phase change caused by the vibration of the targets and/or measurement points in the i-th transmission cycle. Accordingly, when multi-channel baseband signals are analyzed in the angle dimension, the component corresponding to the target and/or measurement point is represented, in the form of a phase complex vector, as $$S_B(\theta) = \begin{bmatrix} A_1 e^{j(\theta_1+\varphi_i)} \\ A_2 e^{j(\theta_2+\varphi_i+2\pi d\sin\theta/\lambda_0)} \\ \vdots \\ A_M e^{j(\theta_M+\varphi_i+2\pi d(M-1)\sin\theta/\lambda_0)} \end{bmatrix}$$

where $\theta$ is an azimuth angle or a pitch angle of a target and/or measurement point in the field of view of the radar, and $A_1, \ldots, A_M$ and $\theta_1+\varphi_i, \ldots, \theta_M+\varphi_i$ are respectively amplitudes and phases of complex vectors corresponding to the targets and/or measurement points in various channels. In consideration that hardware performances of all receiving channels are approximately consistent, and that the deviations of the amplitudes and phases of various channels only cause a constant phase shift to the estimation of $\varphi_i$, i=1, 2, . . . within a plurality of sweep cycles, it can be learned that $A_1 \approx \ldots A_M \approx A$, and $\theta_1 \approx \ldots \theta_M \approx \theta_R$. From the above-mentioned derivation and analysis, it can be seen that on the one hand, the phase change caused by the vibration in the range dimension is completely transplanted and retained to the angle dimension, such that the vibration information can be extracted according to the phase evolution tracking and estimation of the angle dimension; and on the other hand, for a plurality of targets and/or measurement points, second separation and interference suppression are performed on the targets and/or measurement points in the same range cell and in adjacent range cells in the angle dimension, which greatly improves the interference suppression capability and also achieves the sensing and measurement of full-field vibration.

In order to reduce the amount of calculation and also avoid demodulation errors, an angle dimension phase change caused by the vibration of targets and/or measurement points within each transmission cycle is directly estimated through the formula $$\varphi_l(iT) = \arg\left[\sum_{m=0}^{M-1}\sum_{n=0}^{N-1} s_i(n,m)e^{-j\left(\frac{2\pi n k_l}{N_z}\right)}e^{-j\frac{2\pi m p_l}{M_z}}\right]$$

according to the indexes for the range and angle dimensions of the targets and/or measurement points that are recorded in the previous steps.

For vibration measurement of a plurality of targets and/or measurement points distributed in a three-dimensional space, one of the horizontal azimuth angle dimension and the vertical pitch angle dimension is selected as an angle dimension for processing of the above-mentioned derivation, analysis and calculation, and the angle dimension of targets to be measured and/or measurement points with a strong resolving capability is preferred, that is, the selected angle dimension has a high resolution, and targets to be measured and/or measurement points in this dimension have less adjacent clutter interference and aliasing interference of components in the same range cell.

Step 4.2, since the value interval for the operation of a complex phase angle is $(-\pi, \pi)$, performing phase anti jump processing on the estimated phase evolution time sequence of each target and/or measurement point in consideration that the phase change caused by actual vibration may exceed this interval. The processing method comprises: determining whether the difference in phases of the phase evolution time sequence within adjacent transmission cycles is greater than a certain threshold $\Delta$, where the threshold $\Delta$ is $\pi$, and if the difference in values of two adjacent elements in the phase evolution time sequence is greater than the threshold and the value of the first element is greater than the value of the second element, adding $2\pi$ to the value of the second element; and if the difference is greater than the threshold and the value of the first element is smaller than the value of the second element, subtracting $2\pi$ from the value of the second element, wherein $2\pi$ is added or subtracted in order that the difference in values of two adjacent elements in the phase evolution time sequence is smaller than a constant value $\pi$.

Step 4.3, extracting a vibration displacement time sequence of each target and/or measurement point, and assuming that the vibration displacement time sequence of the l-th target and/or measurement point within the i-th cycle is $x_l(iT)$, $x_l(iT)$ being calculated as:

$$x_l(iT) = \left[\frac{\lambda_c}{4\pi}(\varphi_l(iT) - \varphi_{l\_mean})\right]/\cos\phi_l,$$

where $\lambda_c$ is the wavelength corresponding to a center carrier frequency of a linear frequency modulated transmitted wave, $\varphi_{l\_mean}$ is the mean of the time sequence $\varphi_l(iT)$, $i=1, 2, \ldots$, and $\phi_l$ is an included angle between a vibration direction of the l-th target and/or measurement point and a line-of-sight direction of a radar.

Figure 8:
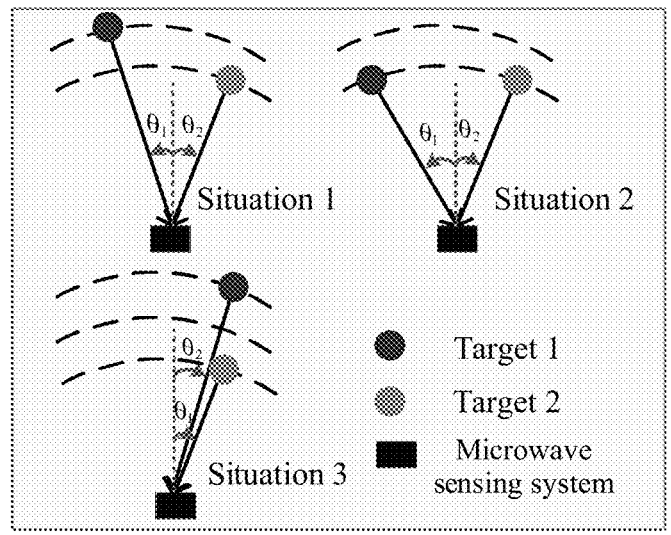
FIG. 8 is a schematic diagram of three typical measurement situations provided in an embodiment of the present invention.
Figure 9A:
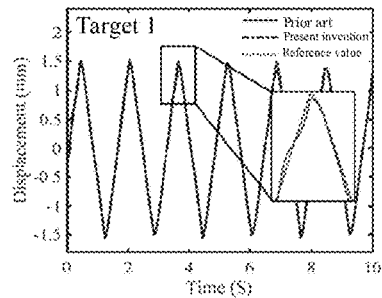
FIGS. 9A, 9B and 9C are respectively comparison diagrams of results for full-field vibration measurement in three typical measurement situations provided in an embodiment of the present invention.
Figure 9A:
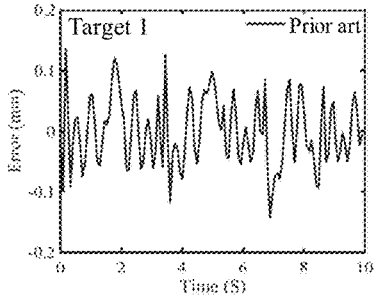
Figure 9A:
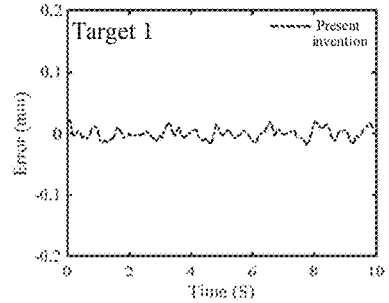
Figure 9A:
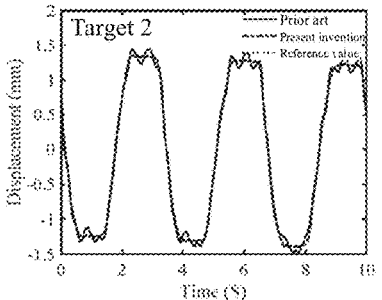
Figure 9A:
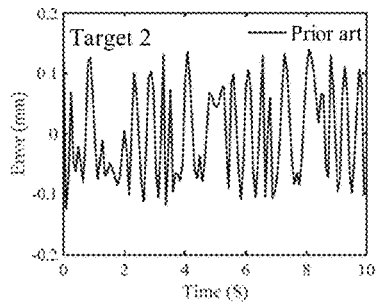
Figure 9A:
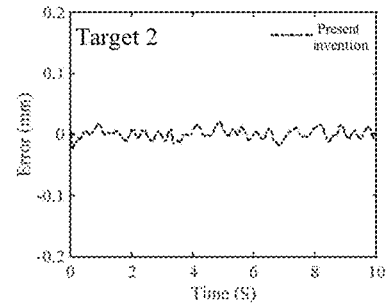
Figure 9B:
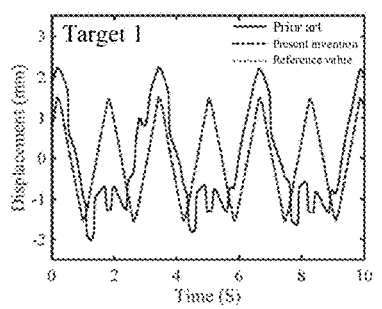
Figure 9B:
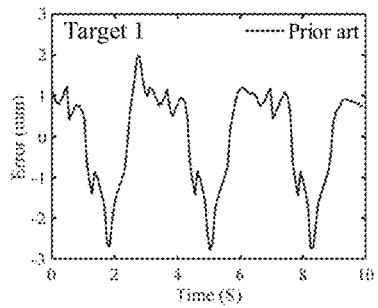
Figure 9B:
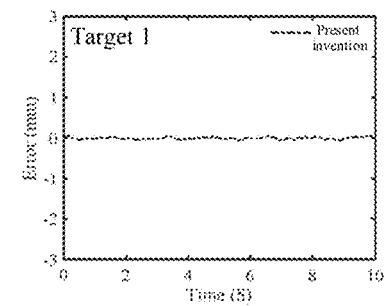
Figure 9B:
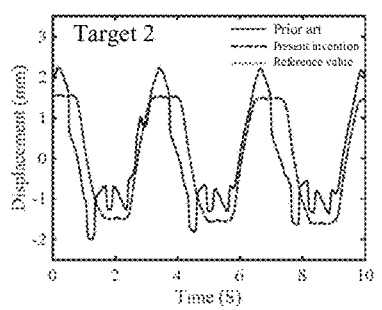
Figure 9B:
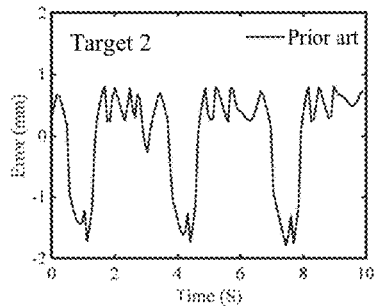
Figure 9B:
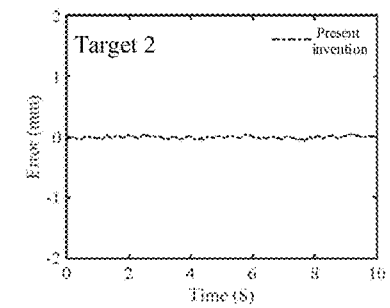
Figure 9C:
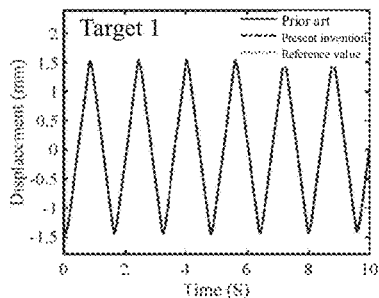
Figure 9C:
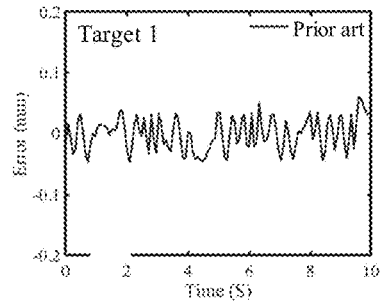
Figure 9C:
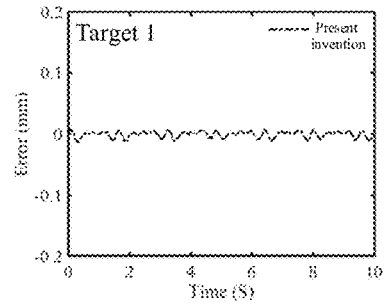
Figure 9C:
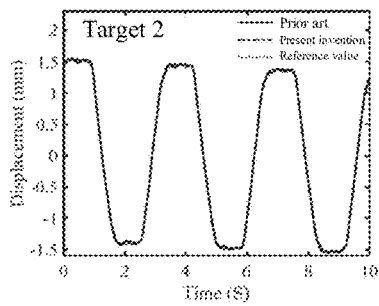
Figure 9C:
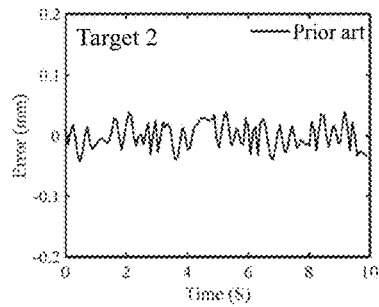
Figure 9C:
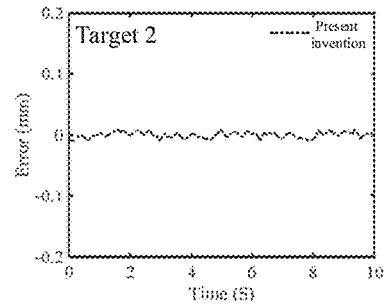

According to the full-field vibration measurement method based on microwave sensing provided in the present invention, by taking two targets as an example, FIG. 8 illustrates three typical test situations, which are respectively coupling interference of adjacent components, aliasing interference of components in the same range cell, and an adjacent angle dimension. FIGS. 9A, 9B and 9C are respectively comparison diagrams of the corresponding measurement results in the three situations of FIG. 8, including measurement results of the prior art, measurement results of the technology of the present invention, and reference values. It can be seen that the full-field vibration measurement method based on microwave sensing provided in the present invention can effectively suppress coupling interference of adjacent components and aliasing interference of components in the same range cell, so as to obtain high-precision vibration waveform measurement results, whereas in the prior art, there are large measurement errors due to clutter interference. In addition, in the case where angle dimensions of two targets approximate in situation 3, the present invention can still achieve better measurement precision and results than those in the prior art.

Figure 10:
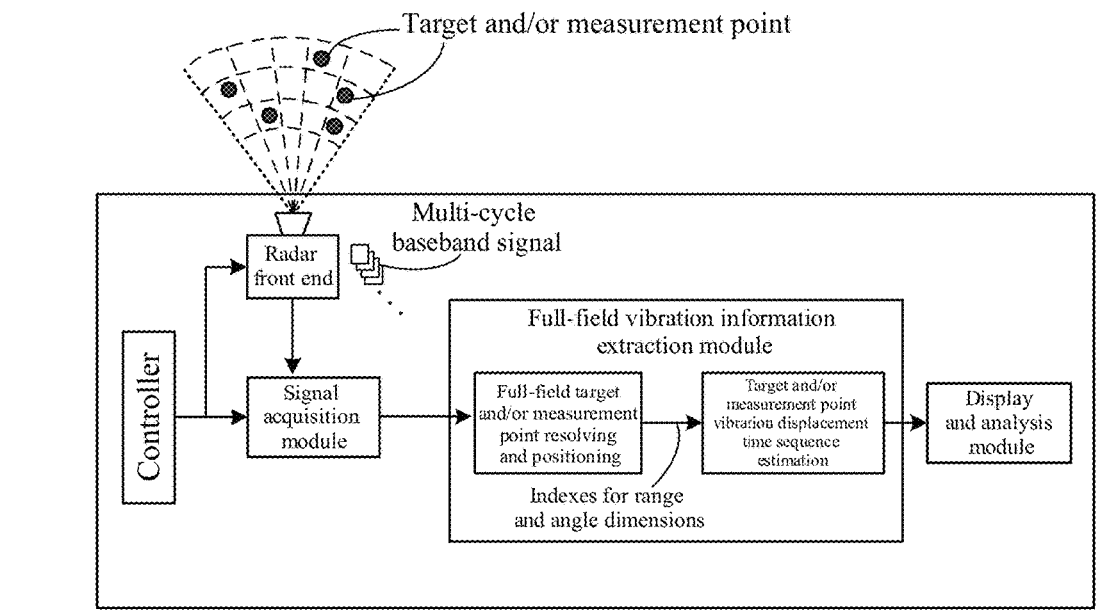
FIG. 10 is a structural block diagram of a vibration measurement system based on microwave sensing provided in an embodiment of the present invention.

A full-field vibration measurement system based on microwave sensing is implemented based on the full-field vibration measurement method above. As shown in FIG. 10, the system comprises a radar front end, a controller, a signal acquisition module, a full-field vibration information extraction module, and a display and analysis module. The radar front end is used to transmit linear frequency modulated continuous wave microwave signals, and is provided with a plurality of receiving antennas and at least one transmitting antenna. The plurality of transmitting antennas are used for the synthesis of a virtual antenna array, which is equivalent to increasing receiving antennas and baseband signal output channels, thereby realizing a multiplied increase in radar angular resolution at a smaller antenna aperture.

Figure 11:
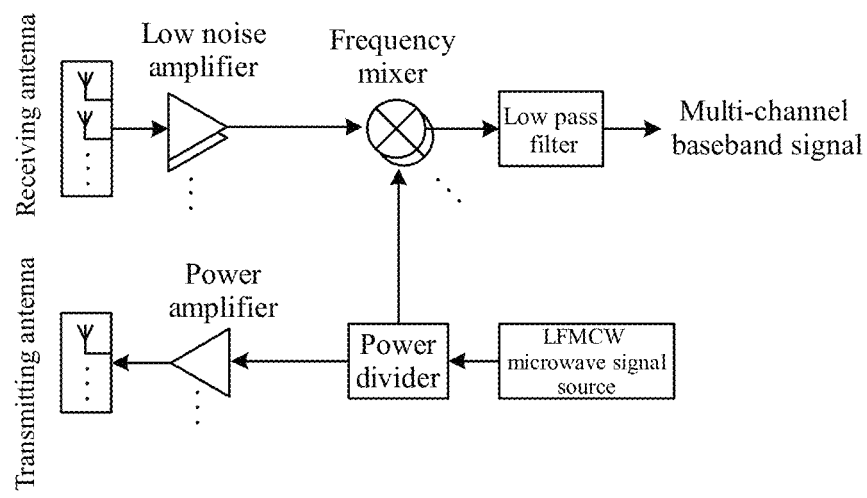
FIG. 11 is a structural block diagram of a radar front end provided in an embodiment of the present invention.

As shown in FIG. 11, the radar front end is composed of a linear frequency modulated continuous wave microwave signal source, i.e. an LFMCW microwave signal source, power dividers, power amplifiers, low noise amplifiers, frequency mixers, low pass filters, transmitting antennas and receiving antennas. The LFMCW microwave signal source is connected to the power divider, one end of the power divider being connected to the power amplifier and the other end thereof being connected to the frequency mixer, the power amplifier is connected to the transmitting antenna, the receiving antenna is connected to the low noise amplifier, the low noise amplifier is connected to the frequency mixer, and an output end of the frequency mixer is connected to the low pass filter.

Signals of the LFMCW microwave signal source are divided into two paths by the power divider, one of which is connected to the transmitting antenna via the power amplifier, and the other of which is connected to the frequency mixer.

The number of the power dividers and of the power amplifiers is equal to the number of the transmitting antennas. Each of the transmitting antennas is connected to one power amplifier and one power divider.

The number of the low noise amplifiers, of the frequency mixers and of the low pass filters is equal to the number of the receiving antennas. Each of the receiving antennas is connected to one low noise amplifier, one frequency mixer and one low pass filter.

The receiving antennas are distributed in a linear array at an equal interval, and the interval is smaller than or equal to half of the wavelength of a transmitted carrier.

If there are a plurality of transmitting antennas, the layout of the transmitting antennas needs to be combined with the layout of the receiving antennas to obtain a virtual receiving antenna array at an equal interval. For vibration measurement of a plurality of targets and/or measurement points distributed in a three-dimensional space, the layout of the transmitting antennas and the receiving antennas needs to realize functions of a horizontal array and a vertical array, such that the transmitting antennas and the receiving antennas have the capabilities of sensing and measurement of a horizontal azimuth angle and a vertical pitch angle.

The controller is configured to set hardware parameters of the radar front end and sampling parameters of the signal acquisition module, and control sequential execution of the steps of the full-field vibration measurement method based on microwave sensing.

The signal acquisition module is configured to perform synchronous sampling on multi-channel intermediate frequency baseband signals and transmit the signals to a full-field vibration information extraction module.

The full-field vibration information extraction module comprises a full-field target and/or measurement point resolving and positioning module and a target and/or measurement point vibration displacement time sequence estimation module; and the full-field vibration information extraction module is configured to resolve and position targets and/or measurement points within the full field based on the acquired multi-channel intermediate frequency baseband signals, and extract a vibration displacement time sequence of each target and/or measurement point.

The display and analysis module is configured to display information including vibration displacement time-domain waveforms of each target and/or measurement point, and analyze the features, such as the vibration amplitude, frequency and full-field vibration characteristic distribution, of each target and/or measurement point as required.

The above description only relates to the preferred embodiments of the present invention, but is not intended to limit the scope of protection of the present invention. Any modifications, equivalent replacements or improvements, etc., within the spirit of the present invention shall fall within the scope of the appended claims of the present invention.

The invention claimed is:

1. A full-field vibration measurement method based on microwave sensing, characterized by comprising the following steps:

step 1, repeatedly transmitting linear frequency modulated continuous wave microwave signals by means of one or more transmitting antennas;

step 2, receiving reflected signals from each of a plurality of targets and/or measurement points by means of a plurality of receiving antennas to determine azimuth angles and/or pitch angles between each of the targets and/or measurement points and the antennas, and performing frequency mixing on received signals and local oscillator signals to obtain multiple equivalent channel intermediate frequency baseband signals, wherein the number of equivalent channels is determined by the number of receiving antennas and the number of transmitting antennas;

step 3, acquiring intermediate frequency baseband signals in various channels, and resolving and positioning targets and/or measurement points within a full field of view of the antennas based on a joint range and angle dimension, wherein the angle refers to the azimuth angles and/or pitch angles within the full field of view of the antennas; and step 4, extracting vibration displacement time-domain information of all targets to be measured and/or measurement points within the full field of view of the antennas;

wherein in step 3, the method for resolving and positioning targets and/or measurement points within the full field based on a joint range and angle dimension comprises:

assuming that the number of equivalent receiving antennas and channels is M, and the number of baseband signals sampled from each channel within each transmission cycle is N, step 3.1, selecting intermediate frequency baseband signals in various channels within a first or certain cycle, which are respectively denoted as $S_1, \ldots S_m, \ldots S_M$, expressing a discrete time sequence of the baseband signal $S_m$ in the channel m (m=1, 2, ... M) as $[s(m, 0), \ldots s(m, n), \ldots s(m, N-1)]^T$, taking a matrix $H=[S_1, \ldots S_m, \ldots S_M]$, and performing a two-dimensional discrete Fourier transform on the matrix H, in the order of transforming signals in each column of the matrix H first, so as to obtain a Fourier transform matrix $H_f$, and then performing a discrete Fourier transform on signals in each row of the matrix $H_f$, so as to obtain a two-dimensional discrete Fourier transform matrix $H_{ff}$;

step 3.2, calculating the amplitude of each element in the matrix $H_{ff}$, denoting the element in the k-th row and p-th column of the matrix $H_{ff}$ as S (k, p), and determining, according to a peak position of $$\sum_{p=0}^{P-1} \text{abs}(S(k, p)),$$

a range cell where each target and/or measurement point within the full field is located, where abs (□) is a complex-modulus operation, and P is the total number of columns of the matrix $H_{ff}$, and recording an index $k_l$ (l=1, ..., L) for a peak position corresponding to each target and/or measurement point, where L is the total number of the targets and/or measurement points; and step 3.3, determining an angle cell where the target and/or measurement point is located according to a peak position of the amplitude of vectors $H_{ff}(k_l,:)$ in the $k_l$-th row of the matrix $H_{ff}$, and recording an index $p_l$ (l=1, ..., L) for a peak position corresponding to each target and/or measurement point, where L is the total number of the targets and/or measurement points.

2. The full-field vibration measurement method based on microwave sensing according to claim 1, characterized in that in step 1, the plurality of transmitting antennas are used for the synthesis of a virtual antenna array, which is equivalent to increasing the number of receiving antennas and baseband signal output channels.

3. The full-field vibration measurement method based on microwave sensing according to claim 1, characterized in that in step 1, the linear frequency modulated continuous wave microwave signals are repeatedly transmitted in a successive manner or at a fixed interval.

4. The full-field vibration measurement method based on microwave sensing according to claim 1, characterized in that in step 2, the number of the receiving antennas is greater than or equal to 2.

5. The full-field vibration measurement method based on microwave sensing according to claim 1, characterized in that in step 2, the local oscillator signals have the same frequency as the transmitted signals in step 1, both of which are separated by the same signal source.

6. The full-field vibration measurement method based on microwave sensing according to claim 1, characterized in that in step 3, the intermediate frequency baseband signals in the various channels are acquired in a synchronous manner.

7. The full-field vibration measurement method based on microwave sensing according to claim 1, characterized in that in step 4, said extracting vibration displacement time-domain information of the targets to be measured and/or measurement points within the full field comprises the following specific steps:

step 4.1, estimating a phase evolution time sequence of each target and/or measurement point within a plurality of transmission cycles, and assuming that the phase time sequence of the l-th target and/or measurement point within the i-th cycle is where $\varphi_l$=1, 2, . . . , is the serial number of the transmission cycle, and T is a repeated transmission cycle, $\varphi_l(iT)$ being calculated as:

$$\varphi_l(iT) = \arg\left[\sum_{m=0}^{M-1}\sum_{n=0}^{N-1} s_i(n,m)e^{-j\left(\frac{2\pi n k_l}{N_z}\right)}e^{-j\frac{2\pi m p_l}{M_z}}\right]$$

where arg[□] is an operation for taking a complex phase, $s_i$(□) is a multi-channel intermediate frequency baseband signal matrix within the i-th transmission cycle, column vectors of the matrix are discrete intermediate frequency baseband signals in various channels within the i-th transmission cycle, $k_l$ is an index for a range dimension of the l-th target and/or measurement point solved in step 3.2, $p_l$ is an index for an angle dimension of the l-th target and/or measurement point solved in step 3.3, $N_z$ is the number of discrete points for discrete Fourier transform when the discrete Fourier transform is performed on the signals in each column of the matrix H in step 3.1, and $M_z$ is the number of discrete points for discrete Fourier transform when the discrete Fourier transform is performed on the signals in each row of the matrix $H_f$ in step 3.1;

step 4.2, performing phase anti-jump processing on the estimated phase evolution time sequence of each target and/or measurement point; and step 4.3, extracting a vibration displacement time sequence of each target and/or measurement point, and assuming that the vibration displacement time sequence of the l-th target and/or measurement point within the i-th cycle is $x_l(iT)$, $x_l(iT)$ being calculated as:

$$x_l(iT) = \left[\frac{\lambda_c}{4\pi}(\varphi_l(iT) - \varphi_{l\_mean})\right]/\cos\phi_l,$$

where $\lambda_c$ is the wavelength corresponding to a center carrier frequency of a linear frequency modulated transmitted wave, $\varphi_{l\_mean}$ is the mean of the time sequence $\varphi_l(iT)$, i=1, 2, . . . , and $\phi_l$ is an included angle between a vibration direction of the l-th target and/or measurement point and a line-of-sight direction of a radar.

8. The full-field vibration measurement method based on microwave sensing according to claim 7, characterized in that in step 4.2, the method for phase anti-jump processing comprises: determining whether the difference in phases of the phase evolution time sequence within adjacent transmission cycles is greater than a certain threshold Δ, where the threshold Δ is π, and if the difference in values of two adjacent elements in the phase evolution time sequence is greater than the threshold and the value of the first element is greater than the value of the second element, adding 2π to the value of the second element; and if the difference is greater than the threshold and the value of the first element is smaller than the value of the second element, subtracting 2π from the value of the second element, wherein 2π is added or subtracted in order that the difference in values of two adjacent elements in the phase evolution time sequence is smaller than a constant value π.

9. The full-field vibration measurement method based on microwave sensing according to claim 1, characterized in that in step 3.2, the range cell and range estimation value for each target and/or measurement point may also be directly determined from range profile information, that is, calculated based on a peak position of amplitude spectrum of a certain column vector of the matrix $H_f$.

10. The full-field vibration measurement method based on microwave sensing according to claim 1, characterized in that for vibration measurement of a plurality of targets and/or measurement points distributed in a three-dimensional space, the resolving and positioning of targets and/or measurement points within the full field based on a joint range and angle dimension in step 3 are implemented in a range dimension, a horizontal azimuth angle dimension and a vertical pitch angle dimension, respectively.

11. The full-field vibration measurement method based on microwave sensing according to claim 10, characterized in that for vibration measurement of a plurality of targets and/or measurement points distributed in a three-dimensional space, the vibration displacement time-domain information of the targets to be measured and/or measurement points within the full field is extracted in step 4 by selecting one of a horizontal azimuth angle dimension and a vertical pitch angle dimension as an angle dimension for calculation processing.

12. The full-field vibration measurement method based on microwave sensing according to claim 1, characterized in that for vibration measurement of a plurality of targets and/or measurement points distributed in a three-dimensional space, the vibration displacement time-domain information of the targets to be measured and/or measurement points within the full field is extracted in step 4 by selecting one of a horizontal azimuth angle dimension and a vertical pitch angle dimension as an angle dimension for calculation processing.

13. A full-field vibration measurement system based on microwave sensing comprising:
   a radar front end, the radar front end comprising:
      one or more transmitting antennas and a plurality of receiving antennas; and
   a signal acquisition module and a full-field vibration information extraction module, wherein the signal acquisition module is used to perform synchronous sampling on multiple equivalent channel intermediate frequency baseband signals and transmit the signals to the full-field vibration information extraction module, and the full-field vibration information extraction module is used to resolve and position targets and/or measurement points within the full field based on the acquired multiple equivalent channel intermediate frequency baseband signals, and extract a vibration displacement time sequence of each of the targets and/or measurement points;

an analysis module used to analyze features of each of the targets and/or measurement points;

a controller used to set hardware parameters of the radar front end and sampling parameters of the signal acquisition module, and control sequential execution steps of claim 1.

14. The full-field vibration measurement system based on microwave sensing according to claim 13, characterized in that the full-field vibration measurement system based on microwave sensing further comprises:

a signal acquisition module configured to perform synchronous sampling on multi-channel intermediate frequency baseband signals and transmit the signals to a full-field vibration information extraction module;

the full-field vibration information extraction module configured to resolve and position targets and/or measurement points within the full field based on the multi-channel intermediate frequency baseband signals acquired by the signal acquisition module, and extract a vibration displacement time sequence of each target and/or measurement point;

a display and analysis module configured to display information including vibration displacement time-domain waveforms of each target and/or measurement point, and analyze the features, such as the vibration amplitude, frequency and full-field vibration characteristic distribution, of each target and/or measurement point as required; and a controller configured to set hardware parameters of the radar front end and sampling parameters of the signal acquisition module, and control sequential execution of the steps of the full-field vibration measurement method based on microwave sensing.

15. The full-field vibration measurement system based on microwave sensing according to claim 13, characterized in that the radar front end further comprises:

an LFMCW microwave signal source, power dividers, power amplifiers, low noise amplifiers, frequency mixers and low pass filters, wherein the LFMCW microwave signal source is connected to the power divider, one end of the power divider being connected to the power amplifier and the other end thereof being connected to the frequency mixer; the power amplifier is connected to the transmitting antenna, the receiving antenna is connected to the low noise amplifier, the low noise amplifier is connected to the frequency mixer, and an output end of the frequency mixer is connected to the low pass filter;

signals of the LFMCW microwave signal source are divided into two paths by the power divider, one of which is connected to the transmitting antenna via the power amplifier and transmitted by the transmitting antenna;

the receiving antenna receives microwave signals reflected by the targets and/or measurement points, and the microwave signals are transmitted to the frequency mixer via the low noise amplifier; and the frequency mixer mixes the microwave signals transmitted by the low noise amplifier with the other path of microwave signals coming from the power divider, and the mixed microwave signals are processed by the low pass filter to output multi-channel baseband signals.

16. The full-field vibration measurement system based on microwave sensing according to claim 15, characterized in that the number of the power dividers and of the power amplifiers is equal to the number of the transmitting antennas; and each of the transmitting antennas is connected to one power amplifier and one power divider.

17. The full-field vibration measurement system based on microwave sensing according to claim 15, characterized in that the number of the low noise amplifiers, of the frequency mixers and of the low pass filters is equal to the number of the receiving antennas; and each of the receiving antennas is connected to one low noise amplifier, one frequency mixer and one low pass filter.

* * * * *